United States Patent

[11] 3,601,717

[72] Inventor John A. Kuecken
Pittsford, N.Y.
[21] Appl. No. 878,507
[22] Filed Nov. 20, 1969
[45] Patented Aug. 24, 1971
[73] Assignee General Dynamics Corporation

[54] SYSTEM FOR AUTOMATICALLY MATCHING A RADIO FREQUENCY POWER OUTPUT CIRCUIT TO A LOAD
16 Claims, 5 Drawing Figs.

[52] U.S. Cl. ........................................................ 333/17, 325/177, 333/32, 343/861
[51] Int. Cl. ........................................................ H03h 7/40
[50] Field of Search ............................................ 325/174, 177; 333/17, 17 A, 32; 334/69, 70; 343/861

[56] References Cited
UNITED STATES PATENTS

| | | | |
|---|---|---|---|
| 2,855,599 | 10/1958 | Kandoian | 333/32 X |
| 3,281,721 | 10/1966 | Clark | 333/17 |
| 3,464,015 | 8/1969 | Brabham | 343/861 UX |

*Primary Examiner*—Eli Lieberman
*Assistant Examiner*—Paul L. Gensler
*Attorney*—Martin Lu Kacher

ABSTRACT: An automatic antenna coupler is described which uses a variable inductor and a pair of variable capacitors which are alternately switched into the network; the first while tuning the inductor, and the second after the inductor is tuned. While the inductor is tuned the first capacitor is swept through its range of values so that its capacitance changes at a rate much greater than the change in inductance. A control system responsive to the ratio of forward to reverse line voltage detected by a directional coupler stops the tuning process.

INVENTOR.
JOHN A. KUECKEN

BY

ATTORNEY

INVENTOR.
JOHN A. KUECKEN

BY

ATTORNEY

INVENTOR.
JOHN A. KUECKEN

BY

ATTORNEY

SYSTEM FOR AUTOMATICALLY MATCHING A RADIO FREQUENCY POWER OUTPUT CIRCUIT TO A LOAD

The present invention relates to impedance matching networks and particularly to an automatic coupler for matching a radio frequency output circuit to a load, such as an antenna.

The present invention is especially suitable for use in high frequency transmitter systems for matching the output of a transmitter to antennas having a wide range of impedance values (viz., whip antennas of different lengths).

Although matching networks containing inductive and capacitive elements can theoretically be designed to match a transmitter output to an antenna so as to provide a tolerable VSWR level at the transmitter output, the problem remains to automatically control the values of the network elements so that they may be rapidly tuned to provide the proper match. The problem is complicated because the tuning functions of the variable elements are not independent. Thus it has not been feasible to control the elements of a matching network in accordance with a readily available function of the transmitter output signals. Impedance and phase sensors have generally been used to control variable matching network elements. The output signals from these sensors are not orthogonal; therefore, considerable interaction results as the variable elements are adjusted in accordance with the phase and impedance sensor output. Complicated logic systems have therefore been used to control automatic coupler units.

While the relationship between the forward and reflected voltage on a line between the transmitter output and the coupler is a reliable measure of the adequacy of the match provided by the coupler unit, there has been no means for advantageously using an output which is a function of the relationship between forward and reflected power to control the elements of a matching network in the coupler. In accordance with the invention use is made of this relationship with the result that the control for the matching network and the coupler itself is significantly simplified over couplers which have heretofore been available.

Briefly described a system for matching an RF power output circuit, such as a transmitter output, to a load, such as an antenna, includes a matching network having variable inductive and capacitive elements. The value of one of these elements is varied and swept cyclically through its range at a rate much greater than the rate at which the value of the other elements is varied. This may be accomplished, for example by means which changes the value of one of these elements, say the shunt inductance so slowly that the value of the other element, say the series capacitor sweeps through its range many times for each small change in inductance. When the impedance variation is viewed on a Smith chart (viz the rapid variation of the series capacitor with slow changing of shunt inductance is plotted on the chart), the plot appears to be akin to "onion slicing." Onion slicing refers to the sweeping action of the input impedance presented by the network as the network searches for a match between the load and the transmitter output circuit. The drive means, such as motors, which vary the value of the matching network elements, are controlled in accordance with the relationship between the forward and reflected signal passing from the RF output circuit into the matching network. When the ratio of these signals (viz the reflection coefficient) is reduced to a level corresponding to a tolerable VSWR, the drive means are controlled to stop the variation of the matching network elements. Then the coupler system properly matches the RF output to the load.

Accordingly, it is an object of the present invention to provide an improved impedance matching system for radio frequency output circuits.

It is another object of the present invention to provide an improved automatic coupler for matching a transmitter output circuit to a load, such as an antenna.

It is a further object of the present invention to provide an improved automatic coupler capable of handling high power radio frequency signals without damage to the transmitter.

It is a still further object of the present invention to provide an improved automatic antenna coupler having a high matching accuracy (e.g., to VSWR levels which are less than 1.3 to 1).

It is a still further object of the present invention to provide an improved automatic coupler which maintains an impedance match in spite of variations in output signal levels, such as due to power interruptions.

It is a still further object of the present invention to provide an improved automatic antenna coupler which operates at high speeds to attain a match over wide frequency ranges.

It is a still further object of the present invention to provide an improved antenna coupler which is simpler in construction than automatic couplers which have heretofore been available and therefore may be produced at lower cost than such couplers.

The invention itself, both as to its organization and method of operation, as well as additional objects and advantages thereof will become more readily apparent from a reading of the following description in connection with the accompanying drawings in which.

Figures 1, 2, 3:
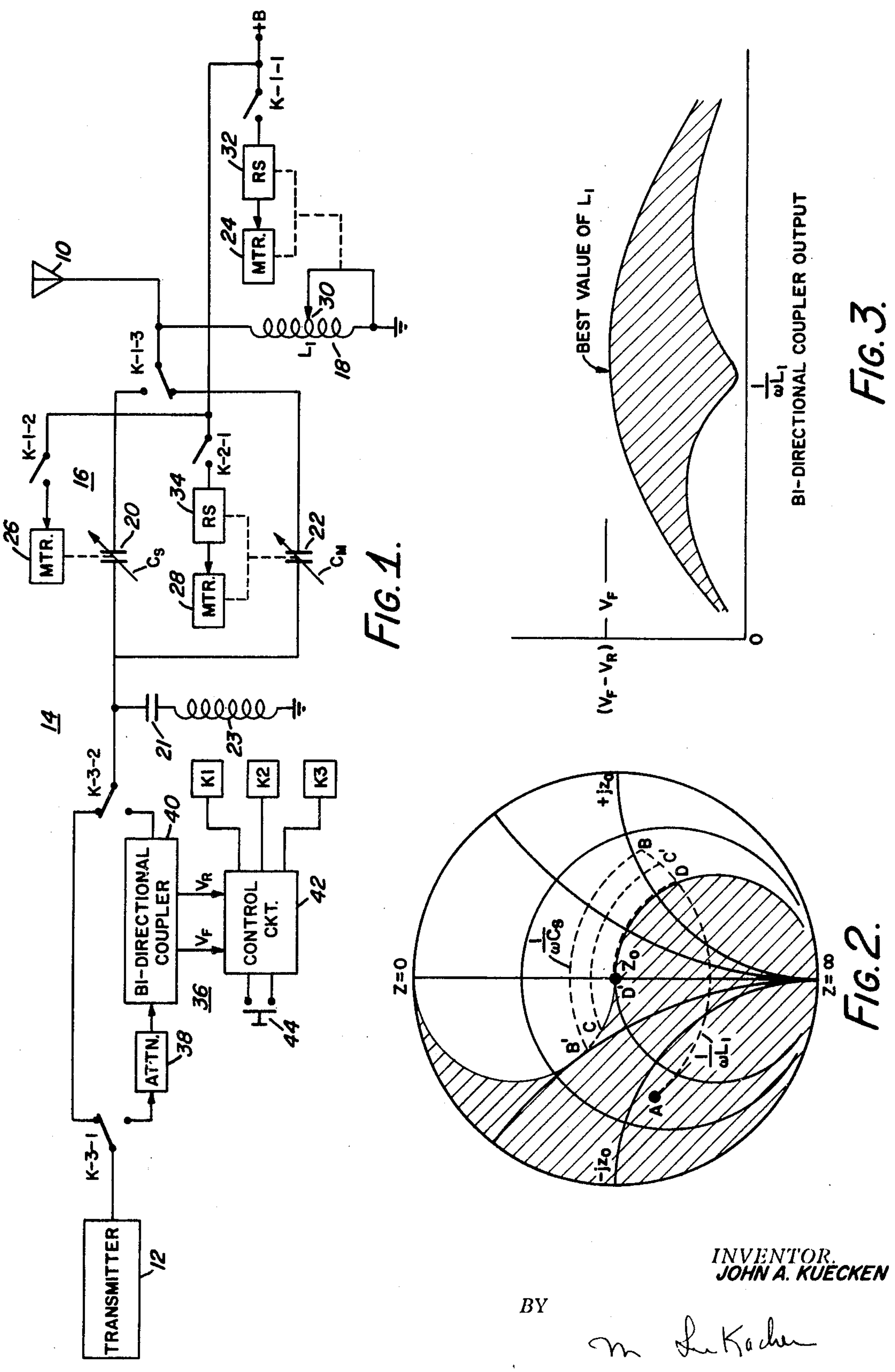
FIG. 1 is a block diagram of an automatic antenna coupler provided in accordance with the invention.
FIG. 2 is a Smith chart which is illustrative of the operation of the antenna coupler shown in FIG. 1.
FIG. 3 is a plot of the difference between forward and reflected voltage at the line connecting the transmitter output to the coupler with variations in inductive susceptance during the tuning process.

Referring more particularly to FIG. 1. The RF output circuit which is to be matched to an antenna 10 is provided at the output of a transmitter 12. The transmitter may be a high-powered HF transmitter providing 400-watt or higher output power over the HF band (2 to 30 MHz.). The coupler system 14 includes a matching network 16 of the L-type having a variable shunt inductor 18, indicated as $L_1$ and a pair of series capacitors 20 and 22 indicated as $C_S$ and $C_M$, respectively. Both capacitors, $C_S$ and $C_M$, are variable as $C_M$ is desirably a vacuum or pressurized capacitor capable of handling the high power produced by the transmitter while $C_S$ may be a butterfly-type capacitor of the air variable type. $C_S$ may take the form of two capacitors which are counter rotating. The value of capacitance presented by the capacitor $C_S$ will sweep or cycle through their ranges (viz, from maximum to minimum capacitance).

Separate drive motors 24, 26 and 28 are provided for varying the inductor $L_I$ and the capacitors $C_S$ and $C_M$, respectively. These may be direct current motors. Desirably the motor 26 is much higher speed than the motor 24. Accordingly, the value of capacitance presented by the capacitor $C_S$ will sweep through many cycles for a small movement of the motor 24. This may readily be accomplished since the inductor $L_I$ may be a roller-type solenoid wound on a coil form on a relatively large diameter, say 1.5 to 2 inches in diameter, the motor 24 rotates the coil which acts as a lead screw which moves the tap 30 slowly across the coil. Limit switches (not shown) are provided at the ends of the coil which operates a reversing switch 32 so that the current flowing to the motor reverses in direction and the motor drives the tap back and forth along the coil. A similar pair of reversing switches 34 may be associated with the vacuum capacitor $C_M$ so that the value of capacitance presented by that capacitor will vary by making the plates thereof move first forward and then away from each other.

The controls for the coupler are provided by a control section 36 which is connected in series between the transmitter 12 output and the matching network 16 during tuning operations. This control section 36 includes an attenuator 38 and a bidirectional coupler 40. The attenuator 38 may insert approximately 3 db. of attenuation at the output of the transmitter in order to reduce reflected signals to a point where they will not damage transmitter output circuits. The bidirectional coupler 40 provides two outputs which are portional to the reflected and forward voltages. These outputs are in the form of a voltage $V_F$ which is proportional to the forward voltage and another voltage $V_R$ which is proportional to the reflected voltage. The bidirectional coupler 40 itself may be of the type described on page 154 of the text "Antennas and Transmission Lines" by John A. Kuecken published by Howard W. Sams and Company, Indianapolis, Indiana (1969).

The voltages $V_F$ and $V_R$ are applied to a control circuit 42 which sequentially operates the relays K1, K2, and K3 after tuning operations are initiated by pressing a pushbutton 44. When the pushbutton 44 is depressed the relay K3 pulls in and becomes latched. The contacts K-3-1 and K-3-2 then connect the control section 36 in series with the matching network 16. Relay K1 then pulls in thereby closing contacts K-1-1, K-1-2 and K-1-3. This causes the motors 24 and 26 which drive the inductor $L_1$ and the capacitor $C_S$ to operate, and connects $C_S$ in the matching network and to the antenna. It should be noted that in a preferred form of the invention the speeds of the motors are so related that the capacitor sweeps through its range of values five times for each rotation of the coil. In the interest of economy, it may be desirable to utilize a common motor and suitable gearing or pulley drives from that motor to the inductor $L_1$ and the capacitor $C_S$.

The control circuit senses the relationship between $V_F$ and $V_R$. When the ratio between $V_F$ and $V_R$ is below a given threshold (indicative of a tolerable VSWR), the really K2 pulls in and the really K1 drops out. The contacts K-2-1 connect power to the drive motor 28 for the capacitor $C_M$ thereby causing the capacitor $C_M$ to change value. Desirably the motor 28 runs more slowly than the motor 26 so that the capacitor $C_M$ is tuned to the correct value without significant overshoot.

When the ratio of $V_R$ and $V_R$ is below the threshold established for tolerable VSWR, the relay K2 drops out thereby disconnecting power from the motor 28 so that the capacitor $C_M$ stops. Note that the relay K1 remains in the dropped out condition so that $C_M$ remains connected in the circuit (viz to the antenna 10 via the contacts K-1-3). Simultaneously the relay K3 is deenergized and the contacts K3-1 and K3-2 go back to their original position disconnecting the control section 36 from the line between the transmitter 12 and the matching network 16, and providing a direct connection therebetween.

Tuning is accomplished in two steps. In the first step the value of the inductor $L_1$ necessary for a match is obtained; in the next step the value of capacitance for the match is restored via the high-voltage capacitor $C_M$. In the event that low power is to be handled by the system, the capacitor $C_S$ alone, which has a lower voltage rating, can be used. Suitable means are then provided to restore the capacitor $C_S$ to its correct setting thereby compensating for any overshoot. For example, the motor 26 may be switched to operate at a lower speed and a reversing switch similar to the switch 34 may be connected in the circuit to accommodate such an extent of overshoot which would require a change of direction in the movement of $C_S$ to reach its correct setting.

The criterion for tuning the inductive and capacitive elements of the matching network 16 remains $V_R$ becoming smaller than $V_F$ by some preset threshold ratio which corresponds to a VSWR which may be tolerated by the transmitter 12.

The operation of the coupler system may be better understood from the Smith chart shown in FIG. 2. As mentioned above, the operation may be referred to as onion slicing due to the slicing action imparted by the sweeping of the input impedance plot on the Smith chart as the matching network searches for the match. According to filter theory the L-network shown in FIG. 1 will match all impedances enclosed within the shaded area on the Smith chart of FIG. 2. Starting with a load admittance as plotted on the chart at point A, a small value of shunt inductances moves the load admittance to point B on the chart. Varying the capacitor $C_S$ at this value of shunt inductance will move the network input impedance along a circle of constant resistance to point B'. By increasing the inductive (which decreases the inductance susceptance) the load admittance is moved to point C. $C_S$ then moves the network input impedance to $C_1$. This variation of the capacitor $C_S$ will make the load admittance enter into the region of acceptable match. A further increase of inductance moves the load admittance to point D. Variation of capacitor $C_S$ moves the load admittance to the point D' where the load impedance matches the impedance $Z_O$ of the transmitter output circuit. It will be appreciated that the converse system utilizing $C_S$ and $C_M$ in shunt and $L_1$ in series will also be operative to provide a match and will cover the mirror image of the areas shaded in FIG. 2.

A circuit made up of a series inductor 23 and capacitor 21 which is resonant below the lowest frequency output signal from the transmitter 12 may be connected in shunt across the input of the matching network 16. This circuit permits the matching network to operate in the upper region of the Smith chart (FIG. 2). Thus, a smaller inductor $L_1$ may be used which facilitates the construction of the coupler when space requirements are restricted.

FIG. 3 illustrates the envelope described by the function ($V_F$—$V_R$) with variations in the susceptance presented by $L_1$. The plot shows that the signal will be an envelope which has a maximum amplitude at the setting of $L_1$ which represents the best match.

The function $V_F$—$V_R$ may be more rigorously treated in terms of the voltage reflection coefficient Γ which is equal to the ratio of $V_R$ to $V_F$. Γ also equals $(Z_i-Z_o)/(Z_i+Z_o)$, where $Z_i$ is the complex input impedance of the network and $Z_O$ is the output impedance to be matched. It will be noted therefore that when the reflection coefficient is a minimum, $Z_i$ equals $Z_O$ approximately and the network provides the desired matched condition to the transmitter output impedance $Z_0$.

Figure 4:
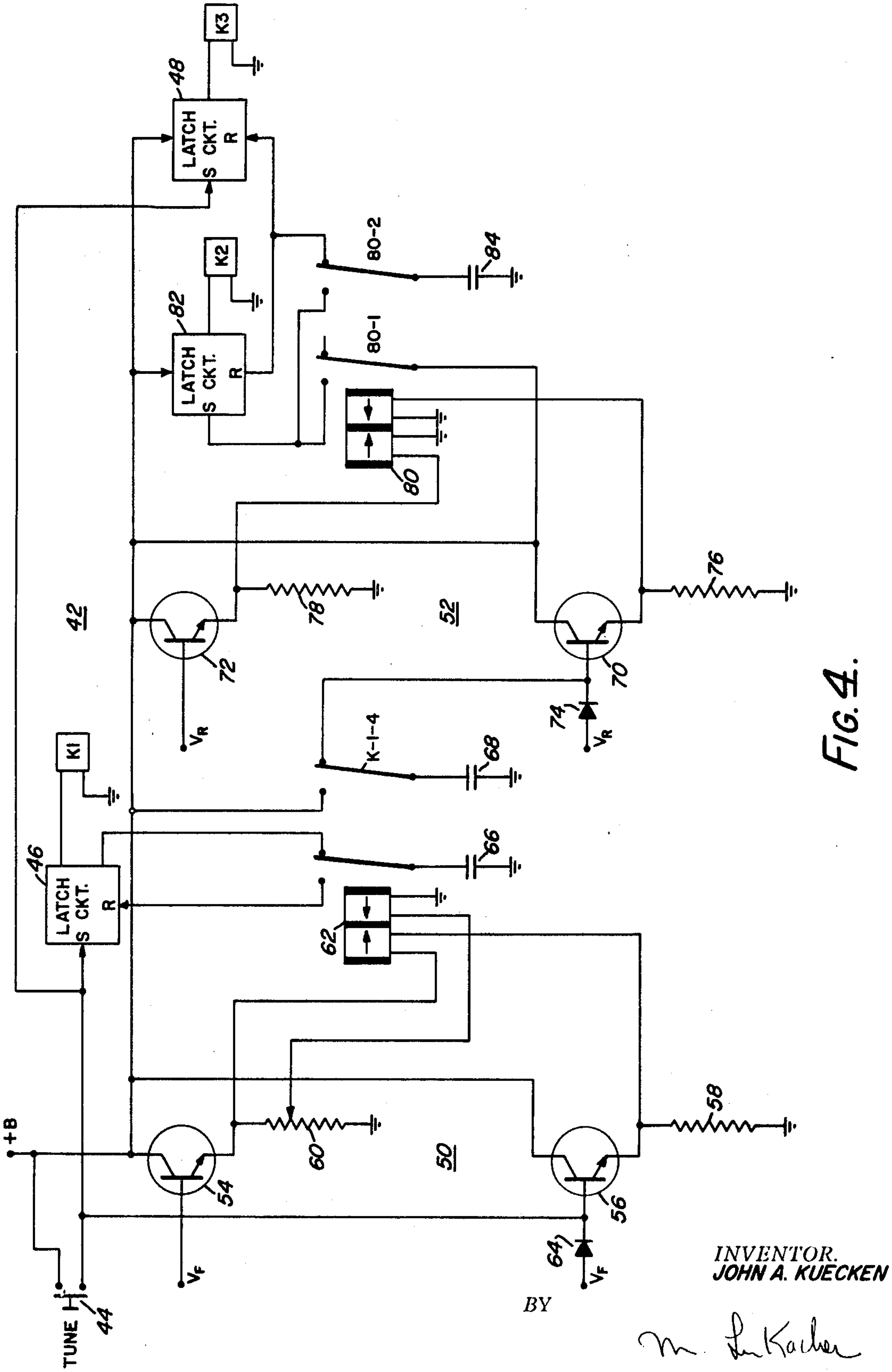
FIG. 4 is a schematic diagram of one embodiment of the control circuitry of the antenna coupler shown in FIG. 1.

A control circuit 42 which is suitable for use in the automatic coupler shown in FIG. 1 is illustrated in FIG. 4. When the tune pushbutton 44 is depressed, a voltage pulse is applied to a latch circuit 46 to set that circuit and thereby apply power to the relay K1. A similar latch circuit 48 is also triggered which applies power to the operating winding of the relay K3. These latch circuits may be relay or flip-flop stages which latch-in the relays K1 and K3 until the circuits 46 and 48 are reset by a reset pulse applied to their reset inputs. By virtue of the operation of the relays K1 and K3, motors 24 and 26 are energized and the control section 36 is connected into the system. The forward and reflected voltages $V_F$ and $V_R$ are then applied to sensing circuits 50 and 52. Contacts of the relay K1 may be connected to the inputs of the sensing circuit 52 so that circuit is not operated until the inductor $L_l$ is set to its proper position.

The sensing circuit 50 includes a pair of transistors of the NPN type 54 and 56. A resistor 58 is connected between the emitter of the transistor 56 and ground and a potentiometer 60 is connected between the emitter and ground of the transistor 54. The sensing circuit 50 also includes a differential relay 62; one side of which is connected across the top portion of the potentiometer 60. The other side of the relay 62 is connected across the resistors 58 and 60 such that the difference between $V_F$ and $V_R$ appears across the left-hand coil of the relay 62 operating winding. The voltage at the top of the potentiometer 60 also reflects the difference between $V_F$ and $V_R$. However, by virtue of the location of the tap, this difference may be reduced to a fraction thereof (0.9 being suitable). The connections to the left side operating winding of the relay 62 are oppositely polarized from the connections made to the right side of the winding. In other words, the relay 62 will be conditioned to drive its contacts to the position shown in the drawing when $V_R$ is greater than 0.1 $V_F$. Since the current flowing through both operating windings determines whether or not the relay will pull in, if the contacts are in the position shown in the drawing, the ration of the difference between $V_F$ minus $V_R$ to $V_F$ must be greater than 0.9 in order for these windings to pull in. Inasmuch as full B plus voltage is applied to the base of the transistor 56 when the tune pushbutton is depressed, the current flowing through the left-hand winding of the relay 62 will necessarily exceed the current flowing in the opposite direction to the other winding of the relay and the contacts will initially be set in the position shown in the drawing. A diode 64 connected to the base of the transistor 56 insures that this DC current due to operation of the pushbutton 44 will not flow back into the bidirectional coupler 40. The sensing circuit 50 therefore functions as a modulation meter which detects when the reflected voltage drops below a preset threshold.

With the relay 62 in the position shown in the drawing, (which occurs when the tuning button 44 is depressed) a capacitor 66 charges to B plus. When relay 62 pulls in, upon detection of the requisite drop in reflected voltage, the capacitor applies the voltage stored thereon to the reset terminal of the latch circuit 46 thereby allowing the relay K1 to drop out. Another contact K-1-4 of this relay K1 is also provided for charging another capacitor 68 when it pulls in. When this capacitor drops out, it applies a biasing voltage to a transistor 70 in the second sensing circuit 52.

The sensing circuit 52 also includes another transistor 72. The transistor 70 receives the reflected voltage $V_R$ via an isolation diode 74. The reverse voltage is applied to the base of the transistor 72. The emitters of the transistors 70 and 72 are connected to ground via resistors 76 and 78. The resistor 76 may be one-tenth the value of the resistor 78 so that for equal input voltages $V_F$ and $V_R$ the voltage across the resistor 78 will be one-tenth that across the resistor 76. Another differential relay 80 is provided by virtue of the bias voltage applied to the transistor 70 placing the contacts 80-1 and 80-2 in a pulled-in position. This applies B+ to the set-in input of a latch circuit 82. This causes the relay K2 to pull in, thus starting the $C_M$ capacitor drive motor 28. A capacitor 84 connected via the 80-2 contact of the relay 80 charges by virtue of being connected to B+ via the contacts 80-1. When $V_F$ is more than ten times $V_R$, a preset threshold is reached causing the relay 80 to drop out. This connects the capacitor 84 via the contacts 80-2 to the reset input of the latch circuit 82 such that the circuit 82 is reset and relay K2 drops out. The capacitor also applies a pulse to the latch circuit 48 causing that circuit to reset thereby permitting the relay K3 to drop out so as to provide the direct connection from the transmitter to the matching network 16.

Figure 5:
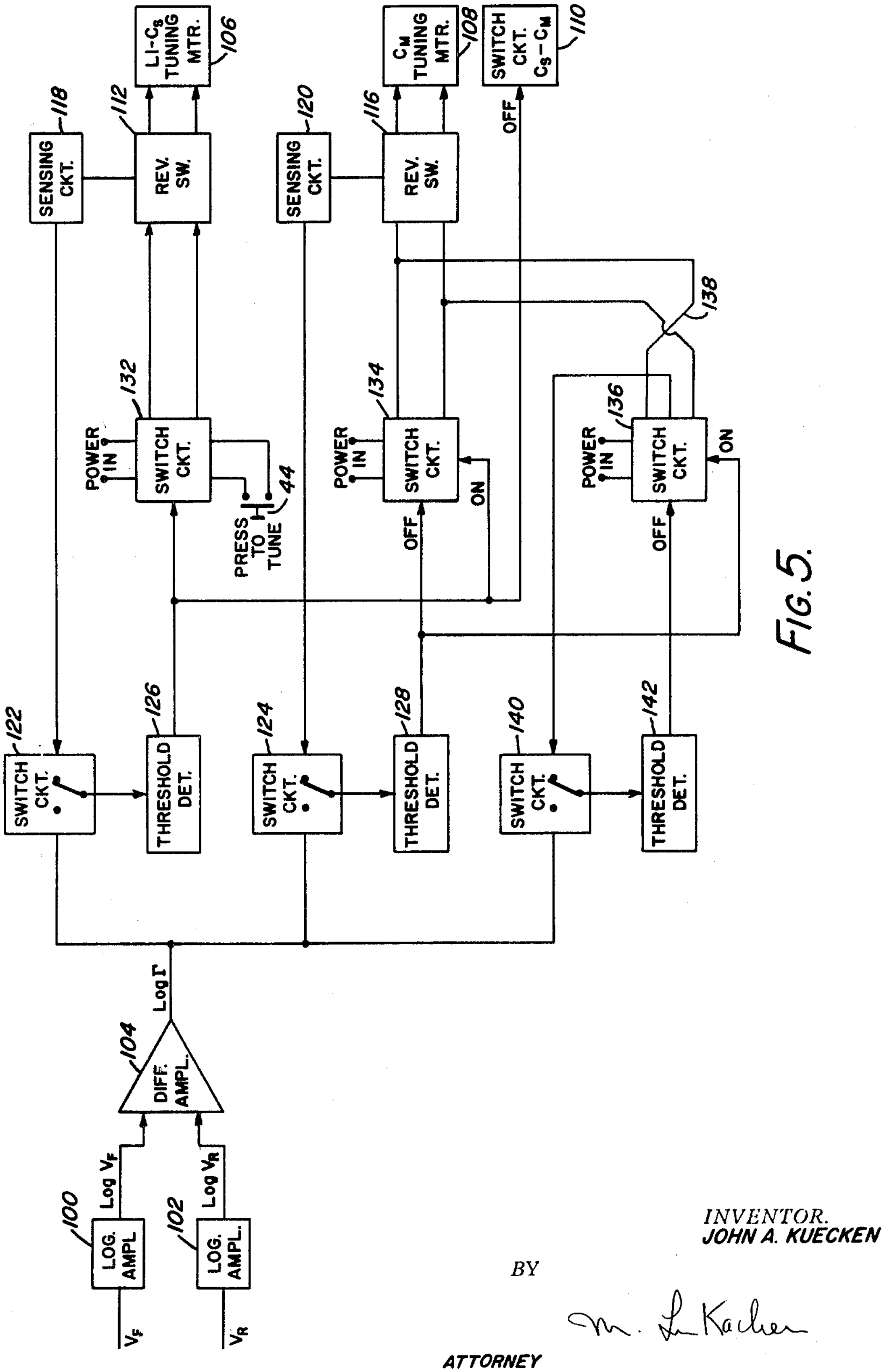
FIG. 5 is a block diagram of another embodiment of the control circuitry for the antenna coupler shown in FIG. 1.

The control circuitry shown in FIG. 5 is operative to derive a control signal which is directly portional to the reflection coefficient.

The forward voltage $V_F$ and the reflected voltage $V_R$ are respectively applied to logarithmetic amplifiers 100 and 102. The difference between the log of $V_F$ and the log of $V_R$ (log $V_F$ −log VR), is obtained by a difference amplifier 104. The output of the difference amplifier 104 is equal to the log of the reflection coefficient. When this function is minimized, and lies below a preset threshold, the reflection coefficient is taken to be reduced to an extent commensurate with a tolerable VSWR at the output of the transmitter 12. The amplifier 100, 102 and 104 may be operational amplifiers. The amplifiers 100 and 102 have suitable feedback network which provide their logarithmic gain characteristics.

The illustrated control system has a common tuning motor 106 for the shunt inductor $L_1$ and the capacitor $C_S$. Suitable gearing belt or pulley drives may be provided such that the capacitor $C_S$ sweeps through its values several times for each passage of $L_1$ through one turn in its range of inductance. Another tuning motor 108 is provided for varying the capacitance presented by the capacitor CM. A switch circuit 110 performs the function of the relay contact K-1-3 and switches the antenna from $C_S$ to $C_M$. The motors 106 and 108 have reversing switches 112 and 116 connected thereto for applying power thereto. These reversing switches may be located in the case of the motor 106 at the ends of the travel of the contact 30 on the inductor $L_1$. Thus, when the tap 30 reaches the end of its travel, current to the motor is reversed and the motor changes direction to cause the tap 30 to travel in the opposite direction. The reversing switch 116 performs a similar function on the reciprocally movable vacuum capacitor $C_M$.

Sensing circuits 118 and 120 are associated with the contacts of the reversing switch. These sensing circuits may contain relays operative when the first limit contact of the reversing switch is actuated for operating switching circuits 122 and 124. These switching circuits may be relays which are operative to connect the output of the difference amplifier 104 to threshold detectors 126 and 128. The switching circuits themselves may be relays or solid state logic.

When the press to tune pushbutton 44 is actuated, the power lines are connected via a switching circuit 132 which is thereupon latched, through the reversing switch 112 to the tuning motor 106. The motor then starts up and moves the tap 30 along the length of the inductor $L_1$ until the first limit switch is actuated thereby actuating the sensing circuit 118. The switch circuit 122 then is operated to connect the output of the difference amplifier 104 to the threshold detector 126. The threshold detector 126 may include a SCR switch which when the output of the differential amplifier reaches a preset level, provides an off command to the switch circuit 132 unlatching the circuit 132 and disconnecting power from the tuning motor 106.

It may be desirable to provide for dynamic braking, say by operating a relay to short circuit the motor when the switch circuit 132 is unlatched, so that the inductor $L_1$ remains at substantially exactly the setting at which it was positioned when the off command is generated by the threshold detector 126.

The command from the threshold detector 126 operates another switching circuit 134 similar to the switch circuit 132, which applies power through the reversing switch 116 to the tuning motor 108. The capacitor $C_M$ then starts to move and when the first limit switch and the reversing switches 116 are actuated the sensing circuit provides an output which operates the switch circuit 124. The threshold detector 128, which may be similar to the threshold detector 126, then receives the output of the difference amplifier 104. Again when this output is above the present threshold, an off command is generated. This off command is applied to the switch circuit 134 which stops the tuning motor. Dynamic braking may be provided for the tuning motor 108 as was the case of the tuning motor 106.

It will be observed that the command from the threshold detector 126 which operated the tuning motor 108 is also operative to control the switch circuit 110 which may be a vacuum relay which drops out and connects the high-power vacuum capacitor $C_M$ into the circuit at the same time as the tuning motor $C_M$ is switched on. A connection may be provided between the switch circuit 110 and the switch circuit 132 which is operated when the press-to-tune button 44 is actuated for the purpose of permitting the vacuum relay to drop in and thereby connect the air variable capacitor $C_S$ into the circuit for initial tuning operations.

Inasmuch as the tuning motor 108 may drive the vacuum capacitor $C_M$ beyond its desired setting which was reached at the time the threshold detector 128 provided its off command to the switch circuit 134, the tuning motor 108 is reversed to bring it back to the desired setting. To this end, another switch circuit 136 is provided which connects power in the reverse direction from that provided by the power line connected to the switch circuit 134, as indicated by the reversal of the output leads 138, to the tuning motor 108. The tuning motor then starts moving backwardly. At the same time, an output signal indicative of the application of power on the output line 138 is applied to another switch circuit 140. When this circuit is actuated, it connects the output of the difference amplifier 104 to another threshold detector 142. This detector which is similar to the detectors 126 and 128 generates an off command to the switch circuit 136, when the difference amplifier 104 output is above the preset threshold. Inasmuch as the tuning motor 108 should not be up to speed at the time the threshold detector 142 generates its off command, the tuning motor 108 will remain at its desired setting, and the matching network 106 will be properly tuned.

From the foregoing description, it will be apparent that there has been provided an improved automatic antenna coupler. Inasmuch as the control devices, such as relays and logic circuits, are available very small in size, the entire coupler may be miniaturized. Thus, it can provide a coupler for portable radio equipment, such as pack sets. Variations and modifications in the herein described system such as substitution of solid-state and microelectric logic for relay logic, will undoubtedly suggest themselves to those skilled in the art. Accordingly, the foregoing description should be taken merely as illustrative and not in any limiting sense.

What is claimed is:

1. A system for matching a radio frequency power output circuit to a load which comprises a. a matching network including a variable capacitive element and a variable inductive element, said elements being connected between said output circuit and said load, b. means for varying one of said elements at a rate much greater than the other so that said one element cyclically sweeps through its range a plurality of times for each sweep of the other of said elements through its range, and c. means responsive to the relationship between the forward and reflected signal passing from said output circuit to said load for controlling said last-named means whereby to provide values of said inductive and capacitive elements which minimize said reflected signal.

2. The invention as set forth in claim 1 wherein said capacitive element is an air variable capacitor which is continuously adjusted and wherein said inductor includes a variable inductance coil, said electromechanical drive means including a reversible drive motor coupled to said inductor for reciprocally moving said tap in opposite directions over the length of said inductive coil, and wherein said electromechanical drive means for said capacitor includes a motor for rotating said capacitor.

3. The invention as set forth in claim 1 wherein said matching network includes a reactive element of the same type as said one element, and wherein means are provided for varying the reactance of said reactive element in response to said relationship between said forward and reflected signal so as to minimize said reflected signal after said controlling means provide said values of said capacitive and inductive elements which minimize said reflected signal, and means for connecting said reactive element in said matching network after said control means provide said values of said capacitive and inductive elements.

4. The invention as set forth in claim 3 wherein said reactive element is connected across said one element and wherein said means for connecting said reactive element in said circuit includes means for substituting said reactive element for said one element in said matching network.

5. The invention as set forth in claim 4 wherein said matching network is an L-network, said inductive element being the shunt arm of said L-network and, said capacitive element being the series arm of said reactive element being connected alternatively in the series arm of said L-network with said capacitive element.

6. The invention as set forth in claim 4 wherein a series connected capacitor and inductor resonant below the lowest frequency produced by said power output circuit is connected in shunt across the input of said matching network.

7. The invention as set forth in claim 5 wherein said reactive element is a capacitor having a higher voltage rating than said capacitive element.

8. The invention as set forth in claim 7 including means for connecting said output circuit directly to said matching network after the values of the elements thereof are provided by said varying means.

9. The invention as set forth in claim 1 wherein said varying means comprises electromechanical drive means coupled to said elements.

10. The invention as set forth in claim 9 wherein said matching network includes another variable capacitive element, means for connecting said other capacitive element in said network after said control means have provided said values of said inductor and said first capacitive element, and wherein said varying means includes another drive motor for varying the capacitance of said other capacitive element independently of said drive motors for said first capacitive element and said inductive element and means responsive to said relationship between said forward and reflected signal for stopping said drive motor for said other capacitive element when said reflected signal is minimized.

11. The invention as set forth in claim 1 wherein said control means includes a directional coupler for providing output voltages which are functions of the forward voltage and reflected voltage applied between said power output circuit and said matching network, and means for initiating and terminating the operation of said varying means responsive to the relationship between said forward and reflected voltages.

12. The invention as set forth in claim 11 wherein said control means includes means for processing said forward and reflected voltages so as to provide an output related to the ratio of said reflected voltage to said forward voltage, and wherein said initiating and terminating means includes means operative to respond to said output when it is less than a preset threshold level indicative of a tolerable VSWR at said power output circuit.

13. The invention as set forth in claim 12 wherein said means for providing said output includes first and second logarithmic amplifiers to which said forward and reflected voltage are respectively applied, and a difference amplifier connected to the output of said logarithmic amplifiers for providing said output as a function of the difference between said logarithmic amplifier outputs.

14. The invention as set forth in claim 12 wherein said means for providing said output includes a differential relay, a first and second amplifier having output resistors, said forward voltage being applied to said first amplifier and said reverse voltage being applied to said second amplifier, means for connecting said output resistors across one winding of said differential relay, and means for connecting at least a portion of said first amplifier output resistor across the other winding of said differential relay, the operation of said differential relay providing said output when the ratio of said reflected to forward voltage is less than said preset threshold.

15. An antenna coupler system comprising a matching network and a control section therefor, said matching network including a first reactive element connected in shunt with said antenna and second and third reactive elements each connected in series with said antenna, a drive motor for sweeping the reactance presented by said first reactive element repeatedly through its range of values, drive means for sweeping said second reactive element repeatedly through its range of values at a rate much greater than the sweeping rate of said first reactive element, drive means for sweeping said third reactive element repeatedly through its range of values, said control section comprising a bidirectional coupler for providing outputs representing the forward and reverse voltage between said transmitter output and said matching network, said control section also including means responsive to the relationship between said forward and reverse voltage for providing an output which is a function of the reflection coefficient of the signal transmitted to said matching network, means for initially connecting said second reactive element to said antenna and for operating said first and second reactive element drive means, means for inhibiting the operation of said first and second reactive element drive means when said output is below a threshold value and connecting said third reactive element to said antenna in lieu of said second reactive element, and means for inhibiting the operation of said third reactive element drive means when said output drops below said preset value and connecting said transmitter directly to said matching network, thereby disconnecting said bidirectional coupler therefrom.

16. The invention as set forth in claim 15 including means for causing said third reactive element drive means to drive said third reactive element in a direction opposite to the direction in which it was travelling when inhibited, and means responsive to said output signal for inhibiting said last-named driving means when said output signal drops below said preset threshold.